Feb. 13, 1962 C. H. NICKELL 3,021,078
IRRIGATION SYSTEM
Filed March 5, 1959 2 Sheets-Sheet 1
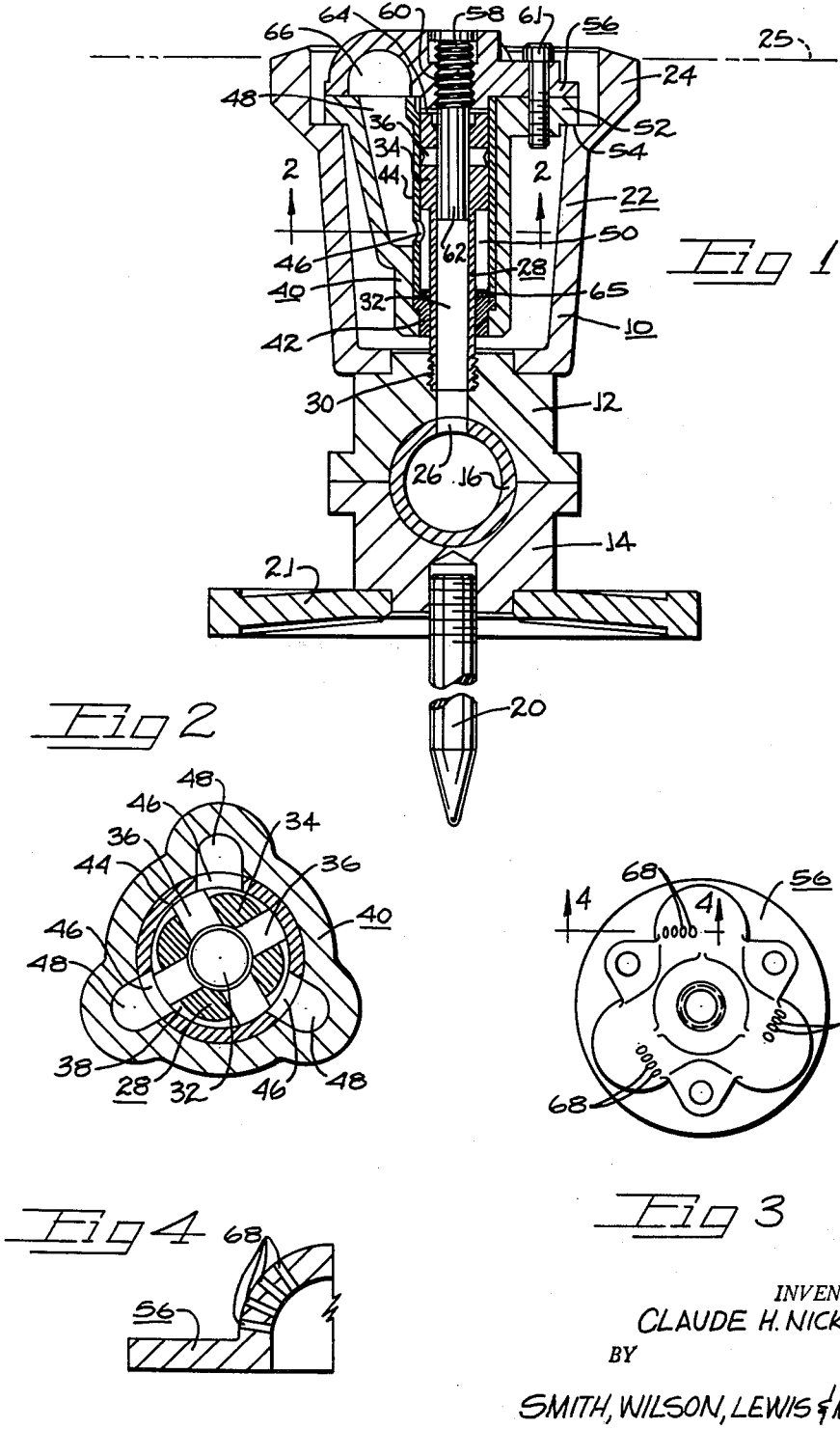
INVENTOR.
CLAUDE H. NICKELL
BY
SMITH, WILSON, LEWIS & McRAE

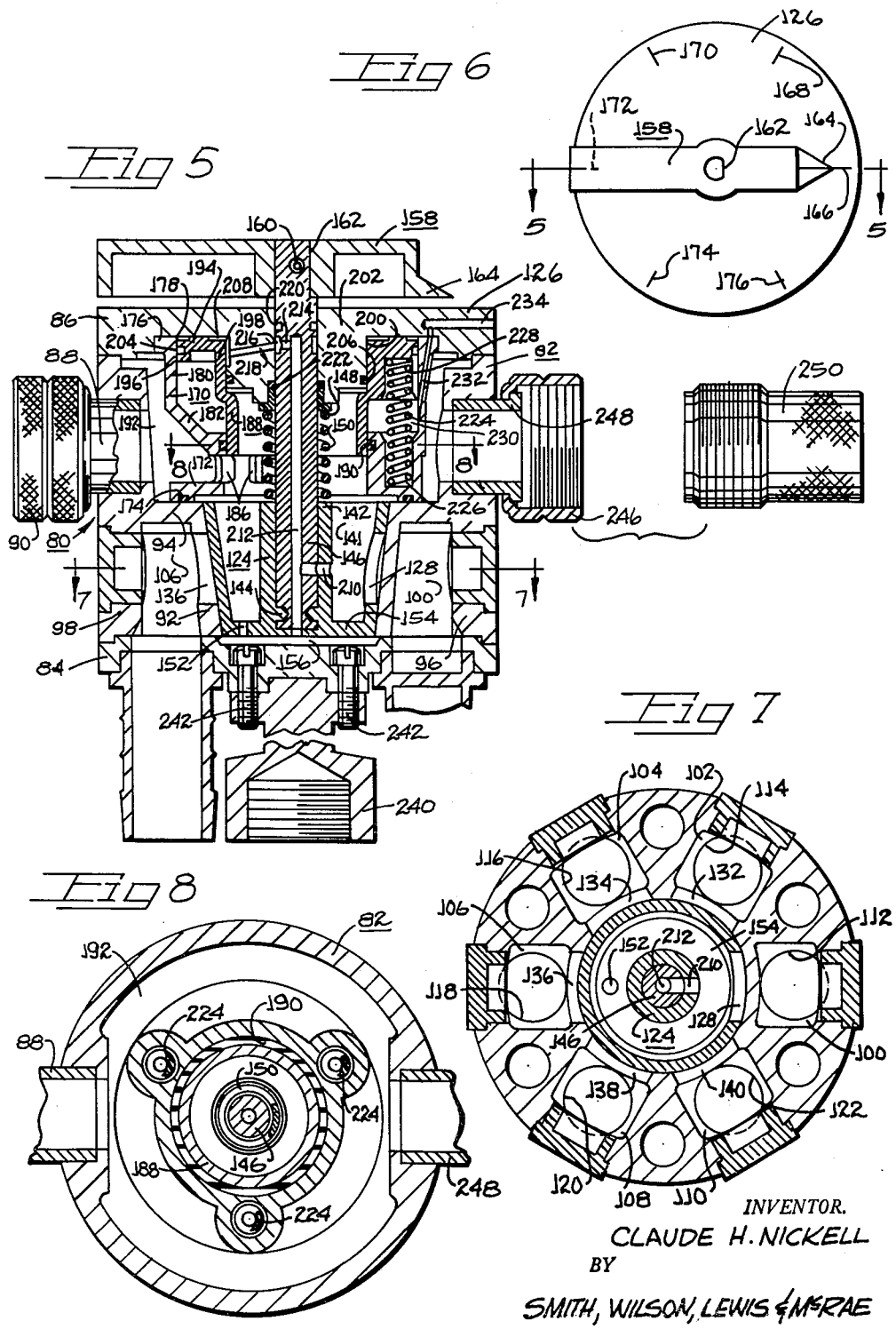

United States Patent Office 3,021,078
Patented Feb. 13, 1962

3,021,078
IRRIGATION SYSTEM
Claude H. Nickell, Dearborn, Mich., assignor of fifty percent to Peninsular Distributing Company, Detroit, Mich.
Filed Mar. 5, 1959, Ser. No. 797,539
6 Claims. (Cl. 239—97)

This invention relates to water sprinkling systems, and more particularly to an improved irrigation system wherein a distributing head of novel design is provided to selectively direct water at substantially uniform fluid pressure to one of several conduits each having a plurality of sprinkler heads designed to spray a predetermined area such for example as a square area.

It is of great importance in inducing luxurious uniform growth in plant life, such for example as grass, flowers, shrubs, etc., that an adequate supply of water be provided at regular intervals, and that the water be distributed evenly.

The majority of the sprinkling devices that have heretofore been commercialized spray circular areas, it being necessary to have a considerable overlapping of the outer peripheries of the areas being sprayed if the entire area is to be uniformly saturated. This overlapping results in uneven distribution of water to the area being sprinkled, portions of the area receiving a greater quantity of water than is necessary while other portions do not receive a sufficient quantity of water to insure adequate growth.

Where more water than is necessary is thus supplied to a given area, the excess over that required to saturate the earth merely seeps away through the soil or runs off to the lower areas. The amount of water required to saturate given areas varies dependent on the types of subsoil, such for example as clay which if positioned high will hold the water table at a relatively high level, whereas sand being porous will permit the water to seep away resulting in a deep water table.

In an effort to overcome the difficulties heretofore encountered water sprinklers have been designed to spray large non-circular areas. These sprinklers have not met with very great commercial success because their coverage varies through wide limits dependent on the water pressure available. During periods when many people in a community are using water the pressure drops, and during those periods the area which can be covered by a sprinkler of any of the conventional types is very limited. During periods when few people are using water the area which can be covered by sprinklers is greatly increased. A considerable degree of attention is therefore required to insure uniform watering.

I have found that best results are achieved where individual sprinkling head assemblies are provided to sprinkle square or other predetermined geometric shapes which can be fitted together to insure complete coverage without undesirable overlapping or under-lapping.

So-called underground sprinkling systems have been devised in an effort to provide uniform coverage. These devices have not proven to be successful because they are undesirably expensive and require high installation costs because trenches must be dug to receive pipes. The expense and difficulties of installation have cooperated to render them unavailable to the average purchaser who desires to use them for home purposes.

An object of my invention is to provide a distributing head having a flow control valve preferably to supply water under substantially uniform pressure to a selected one of a plurality of conduits having sprinkler heads designed to spray a desired geometric pattern.

Another object of my invention is to provide a simplified flow control valve capable of supplying varying quantities of water at substantially uniform pressure.

A further object of my invention is to provide an improved sprinkler head which may be adjusted to spray controlled areas of desired geometric configurations.

Yet a further object of my invention resides in the provision of a sprinkling system wherein a plurality of interconnected sprinkling heads may be adjusted to vary their water flow characteristics to insure uniform coverage over a particular area, spray heads serving larger areas being adjusted to deliver more water than spray heads serving smaller areas, and excessive overlapping or skipping of areas being eliminated.

Another object of my invention is to provide a sprinkling system which may be installed as an underground system by the burying of a flexible water supply conduit or hose at relatively shallow depths, approximately the depth of the sod mat thereby eliminating the necessity of digging relatively deep trenches as is customary with previously used subterranean irrigation systems.

Another object of my invention resides in the provision of concentrically disposed relatively rotatable members having a different number of discharge orifices adapted to move rotationally relative to each other and being interconnected circumferentially by grooves providing predetermined areas to discharge water in accordance with desired geometric patterns.

Yet a further object of my invention resides in the provision of an improved sprinkling head for irrigating a square configurated area wherein a non-rotatable member having four equally spaced apertures interconnected circumferentially by flow control grooves provide predetermined discharge areas which cooperates with a rotatable sleeve mounted thereon and having three equally spaced apertures adapted to substantially align axially with the apertures in the stationary member to provide substantially uniform water spray over a square configurated area.

Still a further object of my invention resides in the provision of an improved sprinkling head wherein geometrical areas of desired predetermined configurations can be sprayed by rotating a sleeve member having a plurality of spaced discharge orifices adapted to align axially with a concentrically disposed non-rotatable member having a different number of spaced discharge orifices.

Yet a further object resides in the provision of an improved distributor valve assembly having a conical shaped valve which may be rotated to spaced stations to selectively direct water to individual conduits each having a plurality of spray heads connected therewith.

Another object of my invention is to provide an improved fluid pressure actuated flow control valve to supply fluid under substantially uniform pressure regardless of variations in the supply pressure above a substantially predetermined minimum pressure.

A further object is to provide a simplified fluid pressure actuated valve which may be fabricated economically to provide substantially constant fluid pressure.

Other objects of this invention will appear in the following description and appended claims, reference being had to the accompanying drawings forming a part of this specification wherein like reference characters designate corresponding parts in the several views.

FIG. 1 is a sectional view of a sprinkler head embodying my invention and designed to spray a square area.

FIG. 2 is a sectional view taken substantially on the staggered line 2—2 of FIG. 1, looking in the direction of the arrows, and showing the rotatable member in the operating position wherein the fluid discharge orifices are axially aligned.

FIG. 3 is a plan view of the rotatable distributor head illustrated in FIG. 1.

FIG. 4 is a fragmentary view taken substantially on the line 4—4 of FIG. 3, looking in the direction of the arrows.

FIG. 5 is a sectional view of a distributor device embodying my invention and adapted to selectively deliver water at substantially uniform pressure to one of a plurality of water distributor lines or conduits.

FIG. 6 is a plan view of the distributor device.

FIG. 7 is a sectional view taken substantially on the line 7—7 of FIG. 5, looking in the direction of the arrows.

FIG. 8 is a sectional view taken substantially on the line 8—8 of FIG. 5, looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to FIG. 1 it will be noted that a sprinkler head assembly 10 is provided with an upper base clamp 12 and a lower base clamp 14 adapted to be secured in clamped relation to a length of resilient plastic or other hose 16 by means of suitable bolts not shown.

A spud or spike member 20 threaded into the bottom of the lower base clamp member 14 may be provided to project into the earth to securely anchor the sprinkler head assembly 10 against radial displacement. If desired an anchor base 21 secured to the base 14 in any desired manner as by bonding may be provided to stabilize the head assembly 10 and to prevent it from shifting its position vertically in the ground.

A well body 22 having a radially extended flange 24 is secured to the upper base clamp 12 in any desired manner as by bonding. In use the sprinkler head assembly 10 is buried in the earth up to approximately the level of the flange 24 which thus defines the ground line 25.

In preparing my improved sprinkler for installation the units thus far described may be assembled by inverting the well body 22 and supporting it on the flange 24 on a flat surface such as on a driveway. The base clamps 12 and 14 are then positioned in clamping engagement with respect to the hose 16 and the bolts used to secure the clamp members 12 and 14 are tightened to securely clamp the hose 16. A drill or other cutting instrument is then inserted through the central vertically extending aperture in base clamp 12 to drill a hole 26 in the hose 16.

A stationary spindle 28 is adapted to be threaded into the upper base clamp 12 as illustrated at 30. The stationary spindle 28 has a hollow bore 32 and has an enlarged upper cylindrical section 34 having crossed ports 36 extending therethrough in communication with the hollow bore 32. The outer periphery of the upper enlarged cylindrical section 34 of the spindle 28 is contoured by the formation of circumferentially extending grooves 38 in the outer periphery thereof axially in the area of the crossed ports 36.

A distributor hub 40 having a lower bearing member 42 formed of brass or other suitable material is mounted on the stationary spindle 28 for rotational movement thereon and vertical axial shifting of the hub on the spindle limited by the enlarged upper cylindrical section 34 on the stationary spindle 28.

The distributor hub 40 has an inner sleeve 44 provided with a plurality, in this instance three, spaced apertures 46 each communicating with its own vertically extending chamber 48 formed between the outer periphery of the hub 40 and the sleeve 44.

It will be noted that a cylindrical chamber 50 is interposed between the lower edge of the enlarged upper cylindrical section 34 of the stationary spindle 28 and the sleeve 44 to permit vertical movement of the distributor hub assembly 40 including the sleeve 44 on the stationary spindle 28.

The upper end of the distributor hub 40 is provided with a radially extended flange 52 proportioned to overlie the internal edge 54 of the well body 22 inside radially, and axially beneath the flange 24. A distributor cap 56 having a stub shaft 58 threaded therein as illustrated at 60 is secured to the flange 52 as by screws 61. The lower end 62 of the stub shaft 58 extends into the hollow bore 32 of the stationary spindle 28 and is adjustable axially therein to provide an adjustment of the volume of water flowing through the crossed ports 36 when the assembly consisting of the distributor hub 40 and the distributor cap 56 are moved to the elevated or operating position by water pressure exerted on the lower end 62 of the stub shaft 58, and exerted in a chamber 64 positioned axially between the upper end of the enlarged upper cylindrical section 34 of the stationary spindle 28 and the lower surface of the distributor cap 56 outside of the stub shaft 58.

The distributor cap 56 is provided with circumferentially spaced chambers 66 aligned with each of the chambers 48. A plurality of angularly related outlet ports 68, FIGS. 3 and 4, are formed in the distributor cap 56 in communication with the chambers 66 and are disposed at an angle to the center of the chambers 66 to impart to the rotatable assembly a rotary component of force as water is discharged through the output ports 68 to rotate the assembly consisting of the distributor hub 40 and the distributor cap 56.

When the spray heads have thus been assembled, an angularly extending cut is formed in the turf and earth where it is desired to install my improved underground sprinkling system. A specially designed tool having a portion adapted to be engaged by a workman's foot and a flange to control the depth of cut is preferably employed to cut the sod and earth, and the cut portion is laid back to expose the groove in which the hose 16 is laid.

The earth is suitably contoured to receive the sprinkler head assemblies 10, the upper flange 24 being positioned approximately flush with the surface of the earth. The spud or spike 20 is projected into the ground so as to securely anchor the sprinkler head assemblies 10 laterally, and when employed, the anchor base 21 is fitted into the earth to anchor the assembly vertically at the desired elevation in the ground.

The angularly inclined cut or slit which was formed in the soil is then laid back over the hose 16 and around the head assemblies 10 whereupon the hose is securely embedded at the desired elevation. Attention is directed to the fact that with my improved irrigation system it is unnecessary to dig trenches in the ground of the area being covered by the underground irrigation system since it is only necessary to bury the hose approximately three inches deep. By assembling the rotatable elements of the spray head in the well body 22 before it is installed in the earth the danger of dirt getting into the assembly to clog the ports or other mechanism is minimized.

In operation when water under pressure is supplied to the sprinkler head assembly 10 through the hose 16, the water flows through the hole 26 in the hose into the hollow bore 32 of the stationary spindle 28. The pressure of the water is exerted on the lower end 62 of the adjusting stub shaft 58 secured in the distributor cap 56 and water under pressure is also delivered to the chamber 64 between the spindle 28 and the distributor cap 56 to exert therein a force to hold the rotatable assembly in the elevated operative position. The pressure of the water in the chamber 64 exerts an upward force on the rotatable cap 56 against the fixed spindle 28 to hold the rotatable assembly in the elevated position determined by engagement of the upper end of the inner bearing member 42 with the lower surface of the cylindrical section 34 of the stationary water outlet 28. It will be noted that a nylon seal 65 is interposed between the lower bearing member 42 and the lower surface of the enlarged upper cylindrical section 34 of the spindle 28 to facilitate rotation of the rotatable assembly.

The adjusted position of the stub shaft 58 in the distributor cap 56 may be varied by turning the shaft 58 in the threads 60 to position the lower end 62 of the stub shaft 58 at varying elevations to adjustably throttle the crossed ports 36 in the spindle 28 to vary the quantity of water discharged by the unit. It will of course be apparent that if desired the quantity of water discharged can be varied by adjusting the vertical position to which the rotatable assembly having the apertures 46 can move relative to the spindle 28 having the crossed ports 36 therein.

In the embodiment illustrated there are four of the ports 36 in the stationary spindle 28, and there are three apertures 46 in the rotatable sleeve 44 of the rotatable assembly. The circumferential grooves 38 formed in the outer periphery of the enlarged upper cylindrical section 34 of the spindle 28 may be varied areawise to permit controlled flow of water from the ports 36 in the fixed spindle 28 to the apertures 46 in the rotatable sleeve 44. The upwardly extending chambers 48 formed in the rotatable distributor hub member 40 are thus individually subjected to varying water pressure as the assembly rotates, and this water is discharged from the radial chambers 66 formed in the distributor cap 56 through the angularly related outlet ports 68 by the varying pressure exerted therein as the assembly rotates.

The chambers 48 and 66 are thus subjected to maximum pressure when their associated aperture 46 in the sleeve 44 is aligned circumferentially with one of the ports 36 in the spindle 28. When the pressure in the chambers 48—66 is the highest the water will of course be discharged the farthest from the outlet ports 68 in the distributor cap 56.

As the assembly continues to rotate beyond the position of alignment of the ports 36 and 46, the apertures 46 in the sleeve 44 move out of alignment with one of the ports 36 in the spindle 28, and the supply of water to the associated chambers 48—66 is reduced to that which can flow through the groove 38. The supply of water to the chambers 48 and 66 thus is progressively decreased as the assembly rotates beyond the position of port alignment and the overlapping of the ports progressively decreases.

The amount of water supplied to the chambers 48 and 66 and the pressure of the water therein will progressively decrease as the apertures move out of alignment, and will progressively increase as the apertures 46 in the rotatable sleeve 44 advance toward alignment with the next port 36 in the spindle 28 and again reaches a peak when the aperture 46 in the sleeve 44 is aligned circumferentially with a port 36 in the spindle 28.

The water pressure in one of the chambers 48 and 66 will thus rise to a maximum when its associated aperture 46 in the sleeve 44 is aligned with one of the ports 36 in the spindle 28, and will decrease to a minimum when its aperture 46 in the sleeve 44 is substantially midway between two ports 36 in the spindle 28 assuring that the contouring of the grooves 38 is symmetrical.

The distance the water will be discharged from the chambers 66 in the rotatable distributor cap 56 varies with the pressure which in turn varies as the head rotates. By suitably proportioning the contouring of the grooves 38 relative to the other elements of the valve structure, I have found that it is possible to spray a square area, or to spray an area of other desired configuration.

It will be understood that the area to be covered by the sprinkler assembly can be modified by changing the circumferential spacing of the angularly related cross ports 36 in the stationary spindle 28. For example, by positioning two of the ports on each side of the assembly relatively closely together, an elongated rectangular discharge pattern can be provided.

The positioning of the sprayed pattern relative to the spray head 10 can be varied angularly by changing the adjusted angular position of the stationary spindle 28 relative to well body 22. The upper end of the spindle 28 may be contoured to receive a suitable tool by which the adjusted angular relation of the spindle can be varied.

The upper end of the stub shaft 58 may be contoured in a desired manner to receive a special tool by which the vertical adjusted position of the stub shaft 58 in the cap 56 can be varied to control the amount of water discharged by the spray head 10. By employing a special tool the danger of the adjusted position being tampered with is minimized.

In use several sprinkler head assemblies 10 will be connected to a single length of hose 16 depending on the water pressure available. Where a relatively large area is to be sprayed the available water pressure is generally not sufficiently high to permit sprinkling the entire area at one time. It is therefore desirable to divide up the entire area to be sprinkled and sprinkle an area that can advantageously be covered by several head assemblies connected to one hose at a time. By providing several hoses each having a desired number of spray head assemblies, and successively operating the spray heads connected to each of the individual hoses, I am able to provide the desired spray coverage.

To permit successively spraying through a limited number of the spray head assemblies connected to each of a plurality of hoses I have provided a novel distributor valve assembly shown in FIGS. 5 to 8 to permit selectively directing water from a supply conduit to each of a plurality of spaced hoses or lines thereby insuring that adequate water pressure will be available to each hose to operate the spray heads connected thereto.

My improved distributor valve preferably incorporates a fluid pressure actuated flow controlled member to insure supplying water to the various hoses or lines at substantially constant pressure regardless of variations in the supply pressure.

In laying out an underground irrigation system the total area to be watered is divided into a number of smaller areas proportioned in such a manner that each of the sections can adequately be covered by one spray head assembly. I have found that the minimum water pressure that is available in the majority of communities is sufficient to adequately supply from three to eight spray heads.

Each spray head of a stated size, when supplied with water at a predetermined pressure is capable of distributing a specified number of gallons of water over an area of a specified dimension in a given period of time. The total area to be watered is subdivided into a number of smaller sections, preferably of square configuration such that a single spray head will adequately water each section. When a determination has thus been made as to the number and location of the spray heads required to cover the area to be watered, a determination is made as to the number of hoses or lines required to supply an adequate amount of water to all of the spray heads.

All of the hoses required to supply all of the spray heads are connected to a single distributor valve 80, preferably having a fluid pressure actuated member to supply water at substantially constant pressure to each of a plurality of selected hoses which supply water to the spray heads.

The distributor valve 80 has a central body section 82 and bottom and top members 84 and 86 respectively. The central section 82 is provided with a water inlet nipple 88 having a fitting 90 adapted to be secured to a watering hose or pipe. A conically disposed wall 92 extends vertically between intermediate and lower walls 94 and 96 respectively in the central body section 82. The space between the conical wall 92 and the outer wall 98 of central body section 82 is divided into a plurality of chambers such for example as the chambers 100, 102, 104, 106, 108 and 110 by radially disposed axially directed walls extending between the intermediate and lower walls 94 and 96.

The bottom closure 84 secured to the central body 82 in any desired manner as by bonding has a plurality of outlet nipples 112, 114, 116, 118, 120 and 122 communicating with each of the chambers 100, 102, 104, 106, 108 and 110 respectively adapted to receive hoses or lines connected to spray heads 10 to deliver water to the area to be watered.

A rotatable valve member 124 having a conical wall 126 adapted to align with the conical wall 92 formed in the central body section 82 is provided with a single aperture 128 adapted to selectively align with a single unapertured wall 130 to interrupt the flow of water through the distributor valve 80 or with one of a plurality of radially extended apertures 132, 134, 136, 138 and 140 which communicate with the chambers 102, 104, 106, 108 and 110 respectively formed in the central body 82. It will thus be apparent that when the apertures 128 formed in the valve member 124 is aligned with the unapertured wall 130 of the conical wall 126 in the central body section 82, the flow of water from a central chamber 141 within the rotatable valve member 124 is interrupted and no water is discharged from the distributing valve.

When the valve member 124 is oscillated to align its single aperture 128 with one of the apertures 132, 134, 136, 138 and 140 formed in the conical wall 92 of the central body member 82, water is discharged from the central chamber 141 through the corresponding chamber 102, 104, 106, 108 and 110 and the respective outlet nipple 114, 116, 118, 120 and 122 respectively to the appropriate hose member connected thereto.

A rotatable valve member 124 is provided with a central hub section 142 secured in any desired manner as by molding, as illustrated at 144, to a shaft 146 journalled in a bushing 148 secured in the top cover 86. A spring 150 surrounding the shaft 146 and interposed between the bushing 148 and the hub 142 of the valve member 124 is provided to yieldingly urge the valve 124 into secure sealing engagement with the conical wall 92 in the central body section 82. It will be noted that a small aperture 152 through the bottom wall 154 of the valve member 124 is provided to subject a chamber 156 interposed between the bottom of the valve 124 and the floor of the bottom section 84 to subject the lower surface of the bottom wall 154 of the valve 124 to substantially the same fluid pressure as is exerted in the chamber 141. It will be noted that the fluid pressure exerted in the chamber 140 exerted over the difference in area of the conical walls 126 of the valve 124 less the area of the shaft 146 is exerted to urge the valve 124 toward the seating position.

A manually actuable handle 158 is secured to the upper end of the shaft 146, a cross pin 160 being provided to prevent longitudinal movement of the handle 158 on the shaft 146, and a D-shaped configuration 162 of the upper end of the shaft 146 engaging a correspondingly shaped configuration in the handle 158, to insure rotational movement of the handle 158 and shaft 146 in unison.

The handle 158 is provided with a pointer 164 adapted, as illustrated in FIG. 6, to align with a suitable graduation 166 on the cover 126 to indicate for example that the aperture 128 in the valve 124 is aligned with the unapertured wall 130 of the conical wall 92 to indicate that the flow of water through the distributing valve 82 is cut off. When the pointer 164 aligns with the graduations 168, 170, 172, 174 and 176 on the top cover 86, the aperture 128 in the valve 124 is aligned with the apertures 132, 134, 136, 138 and 140 respectively to direct water from the chamber 141 within the valve to the outlet nipples 114, 116, 118, 120 and 122 respectively to selectively direct water to conduits or lines connected thereto.

In order to supply fluid at substantially constant pressure to all of the spray heads 10 which are supplied by hoses or conduits connected to the nipples 114, 116, 118, 120 and 122, I provide a fluid pressure actuated flow control valve in the distributor valve 80.

One illustrative example of a convenient fluid pressure actuated valve for supplying substantially constant water pressure to the various water lines is illustrated in FIGS. 5 and 8.

A guide member 170 is positioned in the central body 82 and has a radially extended flange 172 to overlie the intermediate wall 94 in the central body. A suitable seal such as an O-ring or lathe cut ring 174 positioned in a groove in the flange 172 is provided to engage the intermediate wall 94 to provide a fluid-tight connection therewith.

The upper end of the guide member 170 has a thickened upper edge 176 and is secured in any desired manner as by bonding in fluid-tight relation in a recess 178 formed in the top closure 86. The guide member 170 has a straight cylindrical upper portion 180, an angularly inclined section 182 and a cylindrical section 184 of smaller diameter having a plurality of circumferentially spaced water inlet ports 186.

A fluid pressure actuated water flow control plunger 188 is slidably mounted in the guide member 170. The plunger 188 has a cylindrical valve member 190 slidable axially in the reduced cylindrical section 184 of the guide member 170. The outer surface 191 of the reduced diameter section of the plunger 188 is movable axially of the water inlet ports 186 in the cylindrical section 184 to throttle the flow of water from an inlet chamber 192 to the chamber 141 within the rotatable valve member 124.

The plunger 188 has a radially extending head portion 194 having a peripheral portion 196 slidably mounted within the cylindrical portion 180 of the guide member 170. The plunger 188 has a stepped cylindrical section 198 having an inner cylindrical surface 200 slidably mounted on a depending piston-like portion 202 of the top closure 86, and aligned axially with the outer surface 191 of the cylindrical valve member 190.

The plunger 188 is provided with a fluid seal such for example as an O-ring type seal 204 positioned in a groove formed in the peripheral portion 196 of the head portion 194 to engage the inner cylindrical portion 180 of the guide member 170 in fluid-tight relation. The inner surface of the radially enlarged section 198 of the plunger 188 engages a suitable seal such for example as an O-ring seal 206 positioned in a groove formed in the piston portion of the top closure member 86. The seals 204 and 206 cooperate to provide a sealed chamber 208 between the top 194 of the plunger 188 and the recessed portion 178 formed in the top closure member 86.

The chamber 208 may be subjected to fluid pressure existing in the chamber 141 within the rotatable valve 124 on the downstream side of fluid flow control valve defined by the outer surface 191 of the cylindrical valve member 190 which progressively throttles the water inlet ports 186 formed in the guide member 170. An aperture 210 extending through the hub 142 and aligned with the aperture 128 in the valve member 124 intersects an axial bore 212 in the shaft 146. The bore 212 in the shaft 146 communicates with the chamber 208 above the plunger 188 through a radial bore 214 and a groove 216 formed in the outer periphery of the shaft 146 in alignment axially with a bore 218 extending through the piston portion 202 of the top closure 86 and communicating with the chamber 208 above the O-ring 206. It will be noted that water is prevented from leaking axially along the shaft 146 from the groove 216 by suitable packing or seals such for example as the O-ring seals 220 and 222 positioned above and beneath the groove 216.

The plunger 188 is yieldingly urged upwardly to move the cylindrical valve member 190 toward the open position with reference to the water inlet ports 186 in the guide member 170 by a plurality of spaced springs 224. I preferably employ three springs 224 positioned in axially spaced seats 226 and 228 formed respectively in the stationary guide member 170 and in the movable valve plunger 188. A chamber 230 interposed between the spring seat cavities 226 and 228 may be vented to prevent the entrapment of fluid therein by interconnecting ports 232 and 234 in the guide member 170 and top closure member 86.

The operation is as follows. When it is desired to water an area covered by several conduits each having spray heads 10, the handle 158 is positioned to align the aperture 128 in the rotatable valve 124 with the appropriate aperture 132, 134, 136, 138 or 140 to direct water through the appropriate outlet nipple to which the selected conduit is attached. The water is then turned on to admit water under pressure through the nipple 88 to the inlet chamber 192 of the distributor valve.

The water flows through the inlet ports 186 into the chamber 141, through the aperture 210, bores 212 and 214, groove 216 and bore 218 to the chamber 208 where it exerts a force on the head 194 of the valve plunger 188 urging it downwardly against the resistance of the springs 224 to partially close or restrict the inlet ports 186.

A state of equilibrium is quickly reached dependent on the force exerted by the springs 224 whereupon an adjusted constant pressure will be exerted in the chamber 141. This constant pressure is delivered to the spray heads 10 connected to the selected conduit or line to exert a desired pressure thereon to spray the selected area without undesirable overlapping or skipping of areas. The pressure of the water supplied by the distributing valve 80 may of course be varied by replacing the springs 224 with springs having the desired strength to produce the desired fluid pressure.

When sufficient time has elapsed to saturate the area covered by one of the hoses, the property owner or attendant oscillates the handle 158 to a different angular position to interrupt the flow of water through the line which has been receiving water, and to direct it to another line.

Rotation of the handle 158 oscillates the rotatable valve 124 to align the aperture 128 in the valve with another of the apertures 132, 134, 136, 138 or 140 in the lower portion of the central body 82 to direct water through the appropriate outlet nipple to the newly selected hose or line through which it is desired to direct water. The pressure reducing valve mechanism continues to function in the same manner as previously described to supply to any of the hoses water at substantially the same fluid pressure determined by the force imposed by the springs 224.

It will be noted that my improved distributor valve 80 has a fitting 240 secured thereto as by bolts 242 to permit the distributor valve to be threadedly mounted on a threaded pipe which may be driven into the ground adjacent a faucet or other water outlet to which the fitting 90 may be connected as by a short length of hose to introduce water into the distributor valve.

It will also be noted that a fitting 246 is secured to a nipple 248 secured in the wall of the central body 82 to provide a supply of water at the inlet pressure established in the inlet chamber 192 whenever desired. The fitting 246 may be closed by a threaded plug 250 to prevent the flow of water therethrough, and to force the water to flow through the pressure actuated valve 170—188 to the lines or conduits as previously described for normal operation.

It will be understood that the area of the outlet ports 68 shown in FIGS. 3 and 4 is for illustrative purposes and may be varied as required to provide a desired degree of fluid pressure within the chambers 48 and 64 to vary the distances which water will be sprayed.

I claim:

1. A water sprinkling system comprising a base, a water supply member connected with the base and having a well body, a hollow stationary spindle secured in the base and having a plurality of angularly related outlet ports, circumferentially extending grooves formed in the spindle to provide controlled communication between circumferentially spaced ports, a rotatable distributor assembly having a sleeve axially movable on the stationary spindle and rotatably mounted thereon and having a lesser numbered plurality of angularly related ports adapted to align axially with the outlet ports in the stationary spindle when the device is subjected to water pressure and the sleeve is moved to one extreme position, a hub assembly associated with the sleeve and defining a separate chamber communicating with each of the ports in the sleeve, a cap member secured to the hub and having a plurality of angularly related outlet ports communicating with said chambers to exert on the hub assembly a rotational component of force as water is discharged from the outlet ports, and a flow control member threadedly mounted in the cap and projecting into the hollow stationary spindle to adjust the flow of water through the ports in the stationary spindle.

2. A water sprinkler comprising a base provided with a hollow spindle having a plurality of circumferentially spaced outlet ports, a distributor having a hollow sleeve rotatably mounted on the spindle and having a plurality of circumferentially spaced outlet ports, the circumferential spacing of the ports in the sleeve being different from the circumferential spacing of the ports in the spindle, circumferentially extending passages of varying contour interconnecting the ports in one of the sleeve and spindle members, means defining a separate chamber communicating with each of the ports in the sleeve, a portion of the distributor having angularly related outlet ports communicating with said chamber to impart to the distributor a rotational component of force to induce rotational movement thereof as water is discharged from the chambers to induce circumferential movement of the ports in the sleeve relative to the ports in the spindle.

3. The invention in claim 2 wherein the sleeve is axially slidable on the spindle, and adjustable plunger means rotatable with the sleeve and projecting into the spindle to control the outlet ports therein, and manually operable means to control the adjustable plunger means.

4. The combination with two concentrically disposed relatively rotatably mounted members each having a plurality of circumferentially spaced ports, one of said members having a greater number of ports than the other, of means to admit liquid to flow through the ports of one of said members and to discharge liquid through the ports of the other of said members, circumferentially extending grooves of varying depths interconnecting the ports of one of said members, means responsive to the reaction force of discharged liquid to rotate one of said concentrically disposed members relative to the other, and manually adjustable means to control flow through one of said sets of ports.

5. In a water sprinkler, the combination with a base provided with a spindle having a plurality of circumferentially spaced apertures, of a rotatable housing provided with a sleeve having a plurality of apertures spaced differentially circumferentially than the apertures in the spindle, circumferentially extending passages of varying contour interconnecting the apertures in one of the sleeve and spindle members, the housing defining a plurality of spaced chambers one of which communicates with each of the apertures in the sleeve, angularly related outlet passages in the chambers to impart to the housing a rotational component as the water is discharged from said chambers, and manually adjustable means to control the flow through one of said groups of apertures.

6. A water sprinkler to spray a square area comprising a sleeve having a plurality of angularly related supply passages connected circumferentially by grooves of varying contour, a rotary hub having a differently numbered plurality of angularly related discharge passages in axial alignment with the supply passages, providing a separate discharge chamber in the hub in communication with each of the plurality of fluid supply passages, providing angularly related outlet ports from the discharge chambers to exert on the hub a rotational reaction force to rotate the hub and manually adjustable means to control the axial alignment of the discharge passages relative to the supply passages.

References Cited in the file of this patent

UNITED STATES PATENTS

| | | |
|---|---|---|
| 1,612,135 | Lorraine | Dec. 28, 1926 |
| 1,766,514 | Henry | June 24, 1930 |
| 1,821,579 | Rader | Sept. 1, 1931 |
| 1,919,245 | Munz | July 25, 1933 |
| 1,968,396 | Hollingsworth | July 31, 1934 |
| 2,090,284 | Carlson | Aug. 17, 1937 |
| 2,360,321 | Griswold | Oct. 17, 1944 |
| 2,393,091 | Lacy-Mulhall | Jan. 15, 1946 |
| 2,619,105 | Hauser | Nov. 25, 1952 |
| 2,642,076 | Tigert et al. | June 16, 1953 |
| 2,763,512 | Porter | Sept. 18, 1956 |
| 2,793,910 | Wiebe | May 25, 1957 |
| 2,884,202 | Smith | Apr. 20, 1959 |